United States Patent
Wu et al.

(10) Patent No.: US 12,314,316 B2
(45) Date of Patent: May 27, 2025

(54) COMPUTERIZED SYSTEMS AND METHODS FOR AUTOMATIC GENERATION OF HIGHLIGHT VIDEOS

(71) Applicant: COUPANG CORP., Seoul (KR)

(72) Inventors: Chang Meng Wu, Shanghai (CN); Lei Lei Shang, Shanghai (CN); Shao Bing Sun, Shanghai (CN); Xin Wei, Shanghai (CN)

(73) Assignee: COUPANG CORP., Seoul (KR)

( * ) Notice: Subject to any disclaimer, the term of this patent is extended or adjusted under 35 U.S.C. 154(b) by 0 days.

(21) Appl. No.: 17/885,234

(22) Filed: Aug. 10, 2022

(65) Prior Publication Data

US 2024/0054160 A1 Feb. 15, 2024

(51) Int. Cl.
*G06F 16/738* (2019.01)
*G06Q 30/0201* (2023.01)
*H04L 67/50* (2022.01)

(52) U.S. Cl.
CPC ....... *G06F 16/739* (2019.01); *G06Q 30/0201* (2013.01); *H04L 67/535* (2022.05)

(58) Field of Classification Search
CPC .. G06F 16/739; G06Q 30/0201; H04L 67/535
See application file for complete search history.

(56) References Cited

U.S. PATENT DOCUMENTS

| | | |
|---|---|---|
| 7,260,439 B2 | 8/2007 | Foote et al. |
| 9,253,533 B1 | 2/2016 | Morgan et al. |
| 10,972,524 B1 | 4/2021 | Chambers |

(Continued)

FOREIGN PATENT DOCUMENTS

| | | |
|---|---|---|
| KR | 10-2020-0001153 A | 1/2020 |
| KR | 10-2021-0073077 A | 6/2021 |

(Continued)

OTHER PUBLICATIONS

International Search Report and Written Opinion of the International Search Authority in counterpart International Application No. PCT/IB2023/055437 dated May 26, 2023 (10 pages).

(Continued)

*Primary Examiner* — Richard L Bowen
*Assistant Examiner* — Aryan D Toughiry
(74) *Attorney, Agent, or Firm* — FINNEGAN, HENDERSON, FARABOW, GARRETT & DUNNER LLP

(57) ABSTRACT

Computer-implemented systems and methods for automatic generation of highlight videos are disclosed. The systems and methods may be configured to: retrieve user action data for a plurality of source videos from a predetermined time period; select, based on the retrieved user action data, a predetermined number of source videos of the plurality of source videos; retrieve the selected source videos; for each of the selected source videos: analyze the source video to identify clip points; split the analyzed source video into a plurality of segments; for each segment of the plurality of segments: determine segment data; and calculate a segment highlight score based on the determined segment data; select a number of segments from the plurality of segments based on the calculated segment highlight score of each segment; generate a new video based on the selected segments; and store the new video.

18 Claims, 10 Drawing Sheets

(56) References Cited

U.S. PATENT DOCUMENTS

| | | | |
|---|---|---|---|
| 2012/0215903 A1* | 8/2012 | Fleischman | G06Q 50/01 |
| | | | 709/224 |
| 2016/0034786 A1 | 2/2016 | Suri et al. | |
| 2016/0295260 A1* | 10/2016 | Qu | H04N 21/252 |
| 2018/0098117 A1 | 4/2018 | Kim et al. | |
| 2019/0188479 A1* | 6/2019 | Balasubramanian | G06T 7/251 |
| 2021/0042724 A1* | 2/2021 | Rathod | G07G 1/0054 |
| 2021/0149955 A1 | 5/2021 | Cannon et al. | |

FOREIGN PATENT DOCUMENTS

| | | |
|---|---|---|
| KR | 10-2021-0087095 A | 7/2021 |
| KR | 10-2022-0102522 A | 7/2022 |

OTHER PUBLICATIONS

Office Action in counterpart Taiwanese Application No. 112127706 dated Feb. 19, 2024 (17 pages).
Office Action in counterpart Korean Application No. 10-2022-0123449 dated Jan. 15, 2025 (8 pages).

* cited by examiner

500

| Factors | Score Weights |
| --- | --- |
| Product Keywords (ASR) | MaxWeight |
| Price Board | MaxWeight * 0.75 |
| Seek (VOD) | MaxWeight * 0.5 |
| Play (VOD) | MaxWeight * 0.3 |
| Add Cart (VOD) | MaxWeight * 0.2 |
| Add Cart (Live) | MaxWeight * 0.15 |
| Price Keywords (ASR) | MaxWeight * 0.1 |
| Like (Live) | MaxWeight * 0.1 |
| Chat (Live) | MaxWeight * 0.1 |
| Scene Changes | MaxWeight * 0.1 |

FIG. 5

COMPUTERIZED SYSTEMS AND METHODS FOR AUTOMATIC GENERATION OF HIGHLIGHT VIDEOS

TECHNICAL FIELD

The present disclosure generally relates to computerized systems and methods for automatic generation of highlight videos. In particular, embodiments of the present disclosure relate to inventive and unconventional systems for automatically generating highlight videos from source livestream videos on a video-on-demand (VOD) platform by using audio and video processing techniques as well as user action statistics to identify important segments within livestream videos.

BACKGROUND

Livestream e-commerce platforms provide opportunities for both sellers and customers to interact with one another through real-time broadcasting. In addition, livestreams can simultaneously be recorded to allow buyers to view at any time via video-on-demand (VOD). However, livestreams are usually long (e.g., around 1 hour), which can be overwhelming for customers to view an entire video to find parts that may be of importance to them. In addition, a livestream video may include segments that are not necessarily relevant to one or more products being sold in the livestream, such as introduction segments in which sellers (i.e., streamers) introduce themselves, ending segments in which streamers may say their standard closing statements, and mutes in which streamers do not say anything for a certain period of time (e.g., streamer is away from the livestream).

To mitigate such problems, conventional livestream systems implement highlight (i.e. summary) videos. For example, highlight videos may be created by someone manually going through livestream videos to identify important moments in the livestream videos that when put together, would overall summarize the video. However, manual methods are not suitable because taking into consideration the number of factors influencing whether a segment should be included in a highlight video as well as the process in collecting the data associated with the factors is too complex to be able to efficiently create highlight videos manually. In another example, highlight videos may be created automatically by trimming off predetermined periods of segments at the beginning and the end and/or stitching together predetermined periods of segments (e.g., 1 minute segments taken every 5 minutes). However, creating highlight videos for all of the livestream videos may be a waste of processing resources, resulting in processing inefficiencies and unnecessary costs. For example, some livestream videos may have much better customer traction than others, making them more likely to attract more views and, therefore, more optimal choices for generating highlight videos than less popular videos. However, identifying which livestream videos are more popular than others requires efficiently monitoring and tracking relevant information, such that processing resources are not wasted. Similarly, identifying the best segments within a livestream video to include in a highlight video requires taking into consideration a specific combination of factors to efficiently monitor and track only the necessary information. Furthermore, the importance of factors may not be accounted for, resulting in less-important factors creating noise in the process of creating highlight videos.

Therefore, there is a need for improved methods and systems for automatic generation of highlight videos based on audio processing techniques, video processing techniques, and user action statistics that accounts for the importance of each factor in determining highlight segments.

SUMMARY

One aspect of the present disclosure is directed to a computer-implemented system comprising one or more memory devices storing instructions and one or more processors configured to execute the instructions to perform a method for automatic generation of highlight videos. The method includes retrieving user action data for a plurality of source videos from a predetermined time period, selecting, based on the retrieved user action data, a set of source videos of the plurality of source videos, retrieving the selected set of source videos, and, for each of the selected set of source videos, analyzing the source video to identify clip points and splitting the analyzed source video into a plurality of segments. The method further includes, for each segment of the plurality of segments, determining segment data, calculating a segment highlight score based on the determined segment data, selecting a number of segments from the plurality of segments based on the calculated segment highlight score of each segment, generating a new video based on the selected segments, and storing the new video.

Another aspect of the present disclosure is directed to a method for automatic generation of highlight videos. The method includes retrieving user action data for a plurality of source videos from a predetermined time period, selecting, based on the retrieved user action data, a set of source videos of the plurality of source videos, retrieving the selected set of source videos, and, for each of the selected set of source videos, analyzing the source video to identify clip points and splitting the analyzed source video into a plurality of segments. The method further includes, for each segment of the plurality of segments, determining segment data, calculating a segment highlight score based on the determined segment data, selecting a number of segments from the plurality of segments based on the calculated segment highlight score of each segment, generating a new video based on the selected segments, and storing the new video.

Yet another aspect of the present disclosure is directed to a computer-implemented system comprising at least one processor and at least one non transitory storage medium comprising instructions that, when executed by the at least one processor, cause the at least one processor to perform a method for automatic generation of highlight videos. The method includes retrieving user action data for a plurality of source videos from a predetermined time period, wherein the user action data includes at least a plurality of monitored user interactions associated with each source video of the plurality source videos, selecting, based on the retrieved user action data, a predetermined number of source videos of the plurality of source videos, retrieving the selected source videos, and, for each of the selected source videos, analyzing the source video with audio processing to identify clip points and splitting the analyzed source video into a plurality of segments. The method further includes, for each segment of the plurality of segments, determining segment data based at least partially on the audio processing, calculating a segment highlight score based on the determined segment data, selecting a number of segments from the plurality of segments based on the calculated segment highlight score of each segment, generating a new video based on the selected segments, and storing the new video.

Other systems, methods, and computer-readable media are also discussed herein.

BRIEF DESCRIPTION OF THE DRAWINGS

FIG. 5 shows an exemplary table of factors and their associated score weights, consistent with the disclosed embodiments.

DETAILED DESCRIPTION

Figure 1A:
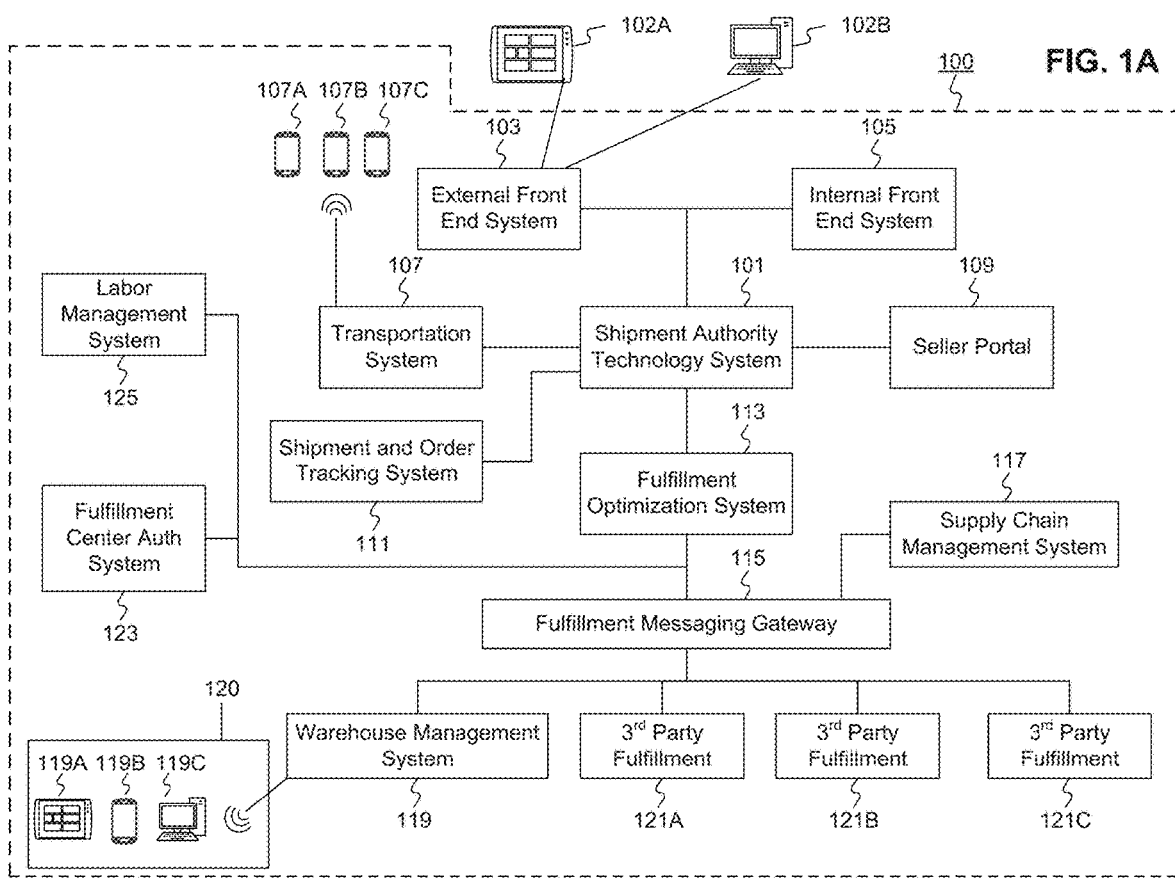
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Detail Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for automatic generation of highlight videos by selecting and retrieving a predetermined number of source videos based on user action data, and, for each of the selected source videos, analyzing the source video and splitting the analyzed source video into a plurality of segments. The method further includes, for each segment of the plurality of segments, determining segment data and calculating a segment highlight score based on the determined segment data, selecting a number of segments based on the calculated segment highlight score of each segment, and generating a new video based on the selected segments for view by one or more users on a video-on-demand platform. The disclosed embodiments provide innovative technical features that allow for automatic generation of highlight videos in an efficient manner. For example, the disclosed embodiments enable selection of a certain number of source videos based on user action data, enable analysis of the selected source videos with audio and/or video processing to identify optimal clipping points for splitting the analyzed source video into a plurality of segments, enable determination of segment data with audio processing, video processing, and user action statistics, enable calculation of a score for each segment, and enable selection of segments, based on the calculated scores, for generation of a highlight video.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 120), 3$^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
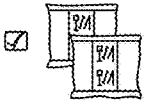
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 120). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 120, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count of products stored in each fulfillment center 120, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. During the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 120), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 120, other products may be stored off-site, may be produced on demand, or may be otherwise unavailable for storage in fulfillment center 120. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 120, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
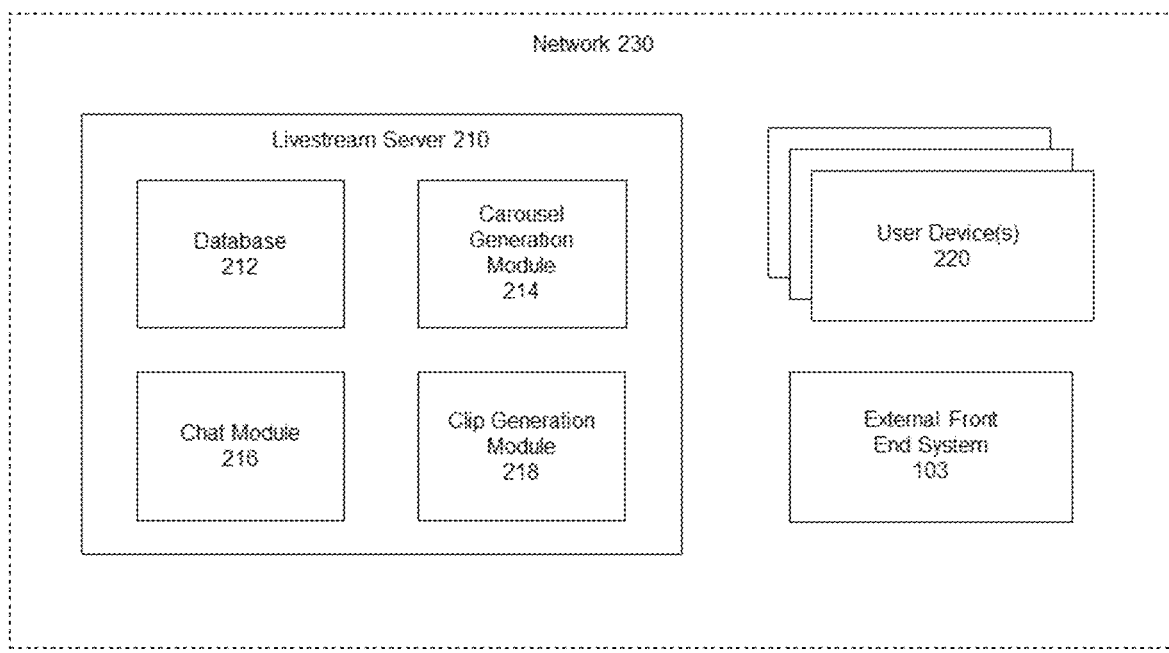
FIG. 2 is schematic block diagram illustrating an exemplary embodiment of a network comprising computerized systems for livestreaming e-commerce, consistent with the disclosed embodiments.

FIG. 2 is a schematic block diagram illustrating an exemplary embodiment of a network comprising computerized systems for livestreaming e-commerce, consistent with the disclosed embodiments. In FIG. 2, streaming system 200 may include livestream server 210 configured to process data streams in real-time to, for example, allow users (e.g., streamers and viewers) to communicate via livestream to advertise, sell and purchase products. Additionally, livestream server 210 may be configured to provide video-on-demand (VOD) services to users such that they can view livestream videos that have ended livestreaming. System 200 may include livestream server 210, user device(s) 220, external front end system 103, and network 230.

Livestream server 210 may take the form of a server, general-purpose computer, a mainframe computer, a special-purpose computing device such as a graphical processing unit (GPU), laptop, or any combination of these computing devices. In these embodiments, components of livestream server 210 (i.e., database 212, carousel generation module 214, chat module 216, clip generation module 218) may be implemented as one or more functional units performed by one or more processors based on instructions stored in the one or more memories. Livestream server 210 may be a standalone system, or it may be part of a subsystem, which may be part of a larger system.

Database 212 may be implemented as either an internal database or an external database communicatively coupled to livestream server 210 via network 230. Database 212 may be configured to collect and/or maintain data associated with users of livestream server 210. For example, database 212 may store information about preferences and actions associated with users of livestream server 210. Further, database 212 may include a plurality of livestream videos and information related to the plurality of livestream videos. For example, database 212 may include information related to each livestream video such as, but not limited to, a number of views, a frequency of plays over time, a frequency of seeks over time, a frequency of likes over time, a frequency of chats over time, a frequency of product keywords spoken over time, a frequency of product boards detected and when, a number of times that a product was added to a user cart over time, a click-through rate (CTR) over time, and a conversion rate (CVR) over time. CVR may be a measure of what proportion of customers are persuaded by a video to add one or more products featured in the video to their respective carts. CTR may be a percentage determined based on the number of times a livestream video is displayed on user interfaces of a VOD platform and a number of times that one or more users click on the displayed livestream video. For example, dividing the number of clicks by the number of impressions (i.e., the number of times the livestream video is displayed), and then multiplying the result by 100 may provide a CTR measurement. Further, database 212 may include a plurality of highlight videos generated from the plurality of livestream videos, discussed in further detail below.

Carousel generation module 214, in some embodiments, may include one or more computing devices configured to generate livestream carousel widgets based on data stored in database 212. For example, carousel generation module 214 may retrieve a plurality of candidate livestreams based on data related to one or more users and data related to a plurality of livestreams, organize the retrieved plurality of candidate livestreams, input data related to a first user and data related to the retrieved plurality of candidate livestreams into a ranking model, such as a ranking neural network, and output a value for each livestream of the organized plurality of candidate livestreams from the ranking model. In addition, based on the outputted value for each livestream, carousel generation module 214 may determine a rank for each livestream of the organized plurality of candidate livestreams, generate a livestream carousel widget including a number of candidate livestreams based on the determined rank, and transmit the generated livestream carousel widget for display on a user interface associated with the first user.

Chat module 216, in some embodiments, may include one or more computing devices configured to enhance livestream engagement. For example, chat module 216 may retrieve, from database 212, a first set of texts and retrieve, for each product of one or more products featured in a livestream, a second set of texts, wherein the second set of texts is generated by compiling a plurality of keywords in review data associated with the product, determining a prevalence value associated with each keyword, selecting one or more keywords based on the determined prevalence value associated with each keyword, organizing the selected one or more keywords, and storing, in database 212, the organized keywords as the second set of texts. Additionally, chat module 216 may transmit a plurality of texts including at least the first and second set of texts for display on one or more user interfaces associated with one or more user devices, and receive user interaction data from at least one of the one or more user devices, wherein the user interaction data includes indication of user interaction by one or more users with at least one or more texts of the plurality of texts via at least one of the one or more user interfaces. Furthermore, chat module 216 may transmit each text of the one or more texts to a second user device, wherein transmitting is based on determining whether the text includes a question, transmitting the text for display on a first page of a second user interface associated with the second user device based on the text not including a question, and transmitting the text for display on a second page of the second user interface based on the text including a question.

Clip generation module 218, in some embodiments, may include one or more computing devices configured to automatically generate highlight videos based on source livestream videos stored in database 212. For example, clip generation module 218 may retrieve user action data for a plurality of source videos from database 212 and select a set of source videos of the plurality of source videos to retrieve from database 212. For each of the selected source videos, clip generation module 218 may split the source video into a plurality of segments and, for each segment, determine segment data to calculate a segment highlight score based on the determined segment data. A number of segments may be selected based on the calculated segment highlight scores and clip generation module 218 may generate a new video based on the selected segments.

Alternatively, components of livestream server 210 may be implemented as one or more computer systems communicating with each other via a network. In this embodiment, each of the one or more computer systems may comprise one or more processors, one or more memories (i.e., non-transitory computer-readable media), and one or more input/output (I/O) devices. In some embodiments, each of the one or more computer systems may take the form of a server, general-purpose computer, a mainframe computer, a special-purpose computing device such as a GPU, laptop, or any combination of these computing devices.

User device(s) 220 may be similar in design, function, or operation to mobile device 102A or computer 102B described above with respect to FIG. 1A. User device(s) 220 may include one or more computing devices configured to perform one or more operations consistent with disclosed embodiments. For example, user device(s) may include a desktop computer, a laptop, a server, a mobile device (e.g., tablet, smart phone, etc.), or other type of computing device capable of running a computer program or software application associated with livestream server 210. For example, a user of user device 220 may download a mobile commerce application to access the services available on livestream server 210. In some embodiments, user device(s) 220 may be part of system 100 (FIG. 1A). User device(s) 220 may navigate to external front end system 103 and request a search by entering information into a search box. In other embodiments, however, user device(s) 220 may be independent from system 100. User device(s) 220 may include one or more processors configured to execute software instructions stored in memory, such as memory included in user device(s) 220, to perform operations to implement the functions described below. User device(s) 220 may be configured for wired and/or wireless communications and may include software that when executed by a processor performs internet-related communication (e.g., TCP/IP) and content display processes. For instance, user device(s) 220 may execute browser software that generates and displays interfaces including content on a display device included in, or connected to, user device(s) 220. User device(s) 220 may execute applications that allow user device(s) 220 to communicate with components over network 230 and display content in interfaces via display devices included in user device(s) 220.

Network 230 may be any type of network configured to provide communications between components of system 200. For example, network 230 may be any type of network (including infrastructure) that provides communications, exchanges information, and/or facilitates the exchange of information, such as the Internet, or other suitable connection(s) that enables the sending and receiving of information between the components of system 200. In other embodiments, network 230 may include multiple networks, organizing for example a network of networks.

Figure 3:
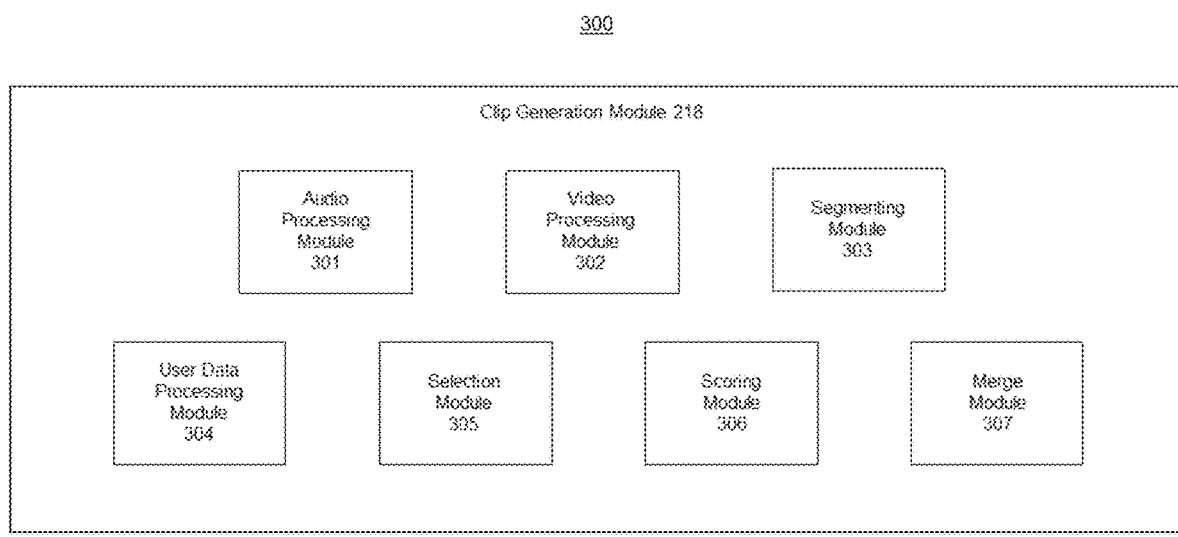
FIG. 3 is a schematic block diagram illustrating an exemplary embodiment of a clip generation module, consistent with the disclosed embodiments.

FIG. 3 is a schematic block diagram 300 illustrating an exemplary embodiment of the clip generation module, consistent with the disclosed embodiments. In FIG. 3, clip generation module 218 may include audio processing module 301, video processing module 302, segmenting module 303, user data processing module 304, selection module 305, scoring module 306, and merge module 307.

Audio processing module 301, in some embodiments, may include one or more computing devices configured to perform voice activity detection (VAD) and/or automatic speech recognition (ASR) to detect the head and tail of a video, sentence breaks, mutes and keywords in source livestream videos. For example, audio processing module 301 may be configured to perform voice activity detection (VAD) to frame audio data of a livestream into several audio frames and filter out the energy into different sub bands. Audio processing module 301 may be further configured use a mathematical model (e.g., Gaussian Mixture Model) to determine whether an audio frame of the several audio frames is a speech signal. Additionally, the model parameters may be adaptively updated to improve the accuracy of the model. In some embodiments, audio processing module 301 may include one or more computing devices configured to perform automatic speech recognition (ASR). For example, the audio processing module may include a deep learning model trained to map a sequence of input acoustic features into a sequence of words. In some embodiments, audio processing module 301 may detect and remove the beginning section (i.e., head) of a video, which may include streamer introductions (i.e., standard comments irrelevant to products) and/or slideshow(s) or brand video(s) presented before a livestream begins. For example, audio processing module 301 may detect the beginning section (e.g., section including any streamer introductions, slideshows, brand videos, etc.) of a video by using natural language processing to remove the detected beginning section from the video. In some embodiments, audio processing module 301 may identify the beginning section by detecting a time at which a streamer officially begins to speak about one or more products. For example, at a time t1 of the video, audio processing module 301 may detect that the streamer begins to say "Today, we will be looking at these products," and understand that a review has officially started. Audio processing module 301 may label the segment of the video up to time t1 as the beginning, or "head," of the video, and may remove the head from the video. Similarly, audio processing module 301 may detect the end section (i.e., tail) of a video by using natural language processing to remove the detected end section from the video. In some embodiments, audio processing module 301 may identify the end section by detecting a time at which a streamer ends a review and begins closing comments (i.e., standard comments irrelevant to products), and may remove the tail from the video. In addition, audio processing module 301 may detect sentence breaks, which may include identification of the beginnings and ends of sentences, and may also detect speechless segments (i.e., mutes). Further, audio processing module 301 may monitor when a streamer in a livestream video utters a keyword (e.g., name of a product, price associated with a product) and may track and store each time at which the keyword was mentioned.

Video processing module 302, in some embodiments, may include one or more computing devices configured to perform text detection, edge detection, text recognition, color histogram analysis, motion vector analysis, sum of absolute differences (SAD) and/or sum of squared differences (SSD) calculations in source livestream videos. In some embodiments, video processing module 302 may detect different times in source livestream videos at which one or more boards appear using edge detection techniques. For example, video processing module may find the boundaries of objects within a video frame by detecting discontinuities in brightness and identify objects with a certain shape (e.g., square) as a board. Additionally or alternatively, video processing module 302 may perform text detection to identify text within boards. For example, video processing module 302 may perform text detection with machine learning techniques (e.g., support vector machines) and convolutional neural networks to classify components within a video frame as text or non-text. In addition, video processing module 302 may use text recognition, such as optical character recognition, to convert images of typed, handwritten or printed text into machine-encoded text to detect highlight segments in source livestream videos. Further, video processing module 302 may use color histogram analysis, motion vector analysis, SAD and/or SSD to detect scene changes. For example, video processing module 302 may determine a difference score for each segment of a plurality of segments (discussed in further detail below with respect to FIG. 4). In some embodiments, video processing module 302 may include a computer vision neural network trained to analyze and make sense of visual data within livestream videos.

Segmenting module 303, in some embodiments, may include one or more computing devices configured to generate segments based on analysis performed by audio processing module 301 and/or video processing module 302. For example, segmenting module 303 may be configured to generate segments based at least in part on sentences detected by audio processing module 301 with VAD and/or ASR. In some embodiments, segmenting module 303 may be configured to generate segments based at least in part on promotion signs (e.g., handmade poster) detected by video processing module 302 with text detection and/or edge detection. In some embodiments, segmenting module 303 may take into consideration both audio and video data generated by audio processing module 301 and video processing module 302 to identify optimal clip locations in source livestream videos. In some embodiments, segmenting module 303 may be configured to generate segments such that each segment is a similar duration of time (e.g., 1 minute).

User data processing module 304, in some embodiments, may include one or more computing devices configured to collect user data associated with a plurality of source livestream videos. For example, user data processing module 304 may be configured to monitor and track live data and video on demand (VOD) data by monitoring user actions associated with livestream videos via one or more user clients, and may transmit the data to a server for logging. In some embodiments, user processing module 304 may measure glance views (i.e., number of times a video is viewed), memory allocation, and/or spikes in web traffic associated with livestreams. In some embodiments, user processing module 304 may track each like, chat, and add-cart action conducted during a livestream along with a timestamp associated with each like, chat and add-cart action to identify segments in the livestream during which there was significant live user interaction (i.e., highlight live segments). In some embodiments, user processing module 304 may determine VOD data, which may include a number of video views, seeks, and add-cart actions related to each video of the source livestream videos to identify videos most popular amongst viewers. In some embodiments, user processing module 304 may determine a number of views, seeks, and add-cart actions for each segment of a livestream VOD video to identify segments in the livestream VOD video at which there was significant VOD user interaction (i.e., highlight video segments). In addition, user data processing module 304 may determine a conversion rate (CVR) and/or a click-through rate (CTR) for each segment of a livestream VOD video. In some embodiments, user data processing module 304 transmits a current play status (e.g., playing, paused, stopped, rewinding/fast-forwarding) comprising timestamp position of the played video periodically (e.g., every 1-10 seconds).

Selection module 305, in some embodiments, may include one or more computing devices configured to identify specific segments according to different factors of a plurality of factors, including frequency of product keywords, seek, play, add cart, like, chat and board detection. For example, in some embodiments, selection module 305 may be configured to identify and select a number of segments with the highest product keyword frequency based on ASR performed by audio processing module 301. Additionally or alternatively, selection module 305 may be configured to select a number of segments with the highest play frequency, a number of segments with the highest user like frequency, a number of segments with the highest user chat frequency, and a number of segments with the highest add-cart action frequency determined by user data processing module 304. Additionally or alternatively, selection module 305 may be configured to select all segments with a board or sign detected by video processing module 302.

Scoring module 306, in some embodiments, may include one or more computing devices configured to receive the data processed by audio processing module 301, video processing module 302, segmenting module 303, user data processing module 304 and selection module 305 and output a score for each segment of the plurality of segments of a livestream video. In some embodiments, scoring module 306 may be configured to begin the scoring process by setting a neutral score (e.g., 0) for each segment of the plurality of segments. Additionally or alternatively, scoring module 306 may be configured to selectively apply a predetermined weight to segment scores for segments selected by selection module 305 according to the plurality of factors. For example, scoring module 306 may apply a maximum weight (i.e., multiply segment score by maximum weight value of 1) to segments selected as having the highest product keyword frequency. Additionally or alternatively, scoring module 306 may determine a difference score for each segment of the plurality of segments based on analysis performed by video processing module 302. For example, scoring module 306 may add a determined difference score for each segment to each segment score of the plurality of segment scores, wherein the determined difference score may be based on a predetermined weight applied to a difference score calculated based on sum of absolute differences (SAD). In the context of the current disclosure, "applying a weight" refers to multiplying a value (e.g., score) by a predetermined weight value (e.g., a value between 0.1 and 1).

Merge module 307, in some embodiments, may include one or more computing devices configured to select a number of segments based on scores determined by scoring module 306 and merge the selected segments to generate a new highlight video. For example, merge module 307 may be configured to select and merge a predetermined number of segments with the highest scores to generate a new highlight video. In some embodiments, merge module 307 may be configured to insert a transition effect (e.g., cross fade) between one or more pairs of selected segment.

Figure 4:
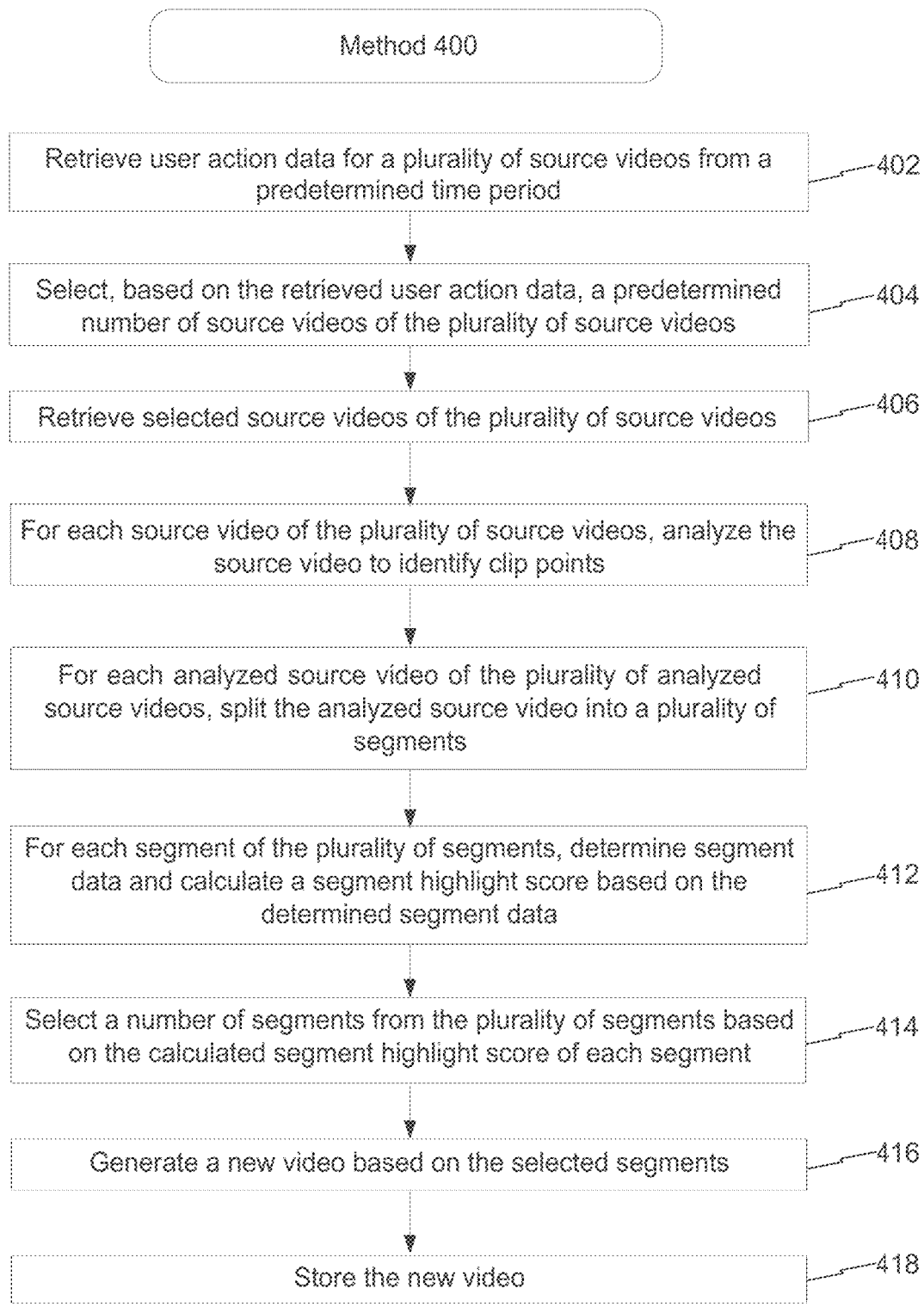
FIG. 4 shows an exemplary method for automatically generating highlight videos by using audio and video processing, consistent with the disclosed embodiments.

FIG. 4 shows an exemplary method 400 for automatically generating highlight videos by using audio and video processing. The method or a portion thereof may be performed by livestream server 210. For example, the system may include one or more processors and a memory storing instructions that, when executed by the one or more processors, cause the system to perform the steps shown in FIG. 4.

In step 402, at least one processor may be configured to retrieve user action data for a plurality of source videos from a predetermined time period. For example, livestream server 210 may automatically retrieve data associated with each livestream conducted in a given period (e.g., the past few days, such as 3 days, 4 days, 1 week, etc.). In some embodiments, once a real-time livestream is finished (i.e., the broadcast ends), livestream server 210 may store the livestream in a database, such as database 212, along with user action data associated with the livestream. For example, livestream server 210 may track user actions (e.g., likes, chats, add-to-cart actions) as a livestream is being broadcast in real-time along with a timestamp for each user action, and may store the user action data in database 212 for later retrieval. Additionally or alternatively, livestream server 210 may track user actions (e.g., seeks, views, add-to-cart actions) associated with each livestream after the livestream is stored in database 212 and available for viewing by users via VOD. For example, livestream server 210 may track each seek, view and add-to-cart action performed by one or more users along with timestamp information associated with each action to identify specific moments in each livestream VOD video that were sought out, viewed, and resulted in adding a product to a user cart. Additionally or alternatively, livestream server 210 may monitor user actions associated with livestreams and livestream VOD videos such as glance views, memory allocation, and/or spikes in web traffic, and may store the user actions in a database 212 for later retrieval.

In step 404, the at least one processor may be configured to select, based on the retrieved user action data, a set of source videos of the plurality of source videos. In some embodiments, livestream server 210 may determine a number of source videos to select based on the retrieved user action data. For example, livestream server 210 may determine which of the livestream VOD videos was the most popular during the predetermined time period based on a number of likes, chats, seeks, views, and/or add-to-cart actions. In some embodiments, livestream server 210 may assign a rank to each livestream VOD video based on the retrieved user action data. For example, livestream server 210 may assign a livestream VOD video with the highest frequency of user actions (e.g., highest number of views over a period of time, e.g., number of views over the length of the livestream VOD video) a highest rank of 1, a livestream VOD video with the next highest frequency of user actions a rank of 2, and so on for all of the livestream VOD videos until it assigns a livestream VOD video with the lowest frequency of user actions a lowest rank. In some embodiments, livestream server 210 may select a predetermined number of VOD videos. For example, the number of source videos to select for further processing may be automatically preset by livestream server 210. Based on the rankings, livestream server 210 may select a predetermined number of source videos (e.g., 10, 50, 100, etc.) of the highest ranked livestream VOD videos. In some embodiments, livestream server 210 may select all source videos with a number of user actions above a predetermined threshold. For example, livestream server 210 may select all source videos with a number of views above a predetermined threshold of 100,000 views. In some embodiments, the number of source videos to select for further processing may be manually preset by an administrator.

In step 406, the at least one processor may be configured to retrieve the selected set of source videos from a database. For example, out of all of the livestream VOD videos (e.g., 1000, 2000, 10000, etc.) in a given period and stored in database 212, livestream server 210 may only retrieve from database 212 the ten percent of livestream VOD videos determined to be the most popular amongst users for further processing. By doing so, livestream server 210 may provide features that reduce processing inefficiencies and cost. (Values other than ten percent are possible in various embodiments.)

In step 408, the at least one processor may be configured to, for each source video of the selected source videos, analyze the source video to identify clip points. For example, livestream server 210 may be configured to perform audio processing, such as voice activity detection (VAD) and automatic speech recognition (ASR), to identify timestamps for the head (i.e., introduction section) and tail (i.e., closing section) of a livestream VOD video, beginnings and ends of sentences, beginnings and ends of mutes, and keywords spoken by a streamer of the livestream VOD video. Additionally or alternatively, livestream server 210 may be configured to perform video processing, such as detecting differences between frames (e.g., color histogram analysis, motion vector analysis, and calculation of sum of absolute differences (SAD) and/or sum of squared differences (SSD)), price board detection (e.g., text detection, edge detection), and text recognition (e.g., optical character recognition) in livestream VOD videos. Based on the audio and/or video processing, livestream server 210 may identify timestamps for clipping the livestream VOD video into several segments.

In step 410, the at least one processor may be configured to split the analyzed source video into a plurality of segments based on the analysis. For example, each livestream VOD video may be around 1 hour and for each analyzed VOD, livestream server 210 may clip the livestream VOD video at the identified timestamps to create a plurality of segments. The split may result in segments including the head and tail of the livestream VOD video as well as mutes, which livestream server 210 may remove from the plurality of segments for further processing. Additionally or alternatively, livestream server 210 may identify timestamps for sentence breaks (i.e. beginning and end of sentence) and may clip at the identified timestamps to create sentence segments. In some embodiments, livestream server 210 may clip the livestream VOD video such that each segment of the plurality of segments is within a predetermined range of time. For example, livestream server 210 may clip the livestream VOD video such that each segment is 30-90 seconds. In another example, livestream server 210 may clip the livestream VOD video such that each segment is 50-70 seconds. In this case, a livestream VOD video that is around 1 hour long would result in about 50 to 70 segments including the head, tail and mutes. In some embodiments, livestream server 210 may clip the livestream VOD video such that each segment is an equivalent duration (e.g., 30 seconds, 1 minute). Additionally or alternatively, livestream server 210 may further clip a segment that has already been clipped. For example, livestream server 210 may first clip the livestream VOD video into a plurality of segments based on the detection of sentence breaks to generate a plurality of sentence segments. In a case where a sentence segment duration is longer than the predetermined range of time, livestream server 210 may further clip the sentence segment based on automatic speech recognition (ASR) to find an optimal second clipping point, and may repeat this process until the sentence segment duration falls within a predetermined range of time.

In step 412, the at least one processor may be configured to, for each segment of the plurality of segments, determine segment data and calculate a segment highlight score based on the determined segment data. In some embodiments, livestream server 210 may use the retrieved user action data to determine a value for each factor of a plurality of factors associated with the user action data (e.g., product keywords (ASR), seek (VOD), play (VOD), add cart (VOD), add cart (live), price keywords (ASR), like (live), chat (live)) for each segment. For example, the value for product keywords (ASR) may be a number of times that a product keyword was detected in a segment using ASR. In another example, the value for add cart (VOD) may be a number of times a product featured in a livestream VOD video was added to a user cart, while the value for add cart (live) may be a number of times a product featured in a livestream was added to a user cart as the livestream was being broadcast in real-time. Additionally or alternatively, livestream server 210 may determine, for each segment, whether there is an appearance of a board or sign in the segment.

Based on the determined segment data, livestream server 210 may be configured to calculate a segment highlight score for each segment, with each segment score starting from a neutral score (e.g., 0). In some embodiments, prior to calculating a segment highlight score for each segment, livestream server 210 may select a number of segments for each factor of the plurality of factors. For example, livestream server 210 may select a predetermined number of segments (e.g., 2, 5, 10, etc.) with the highest frequency of product keywords. Additionally or alternatively, livestream server 210 may select a predetermined number of segments with the highest frequency of plays. Additionally or alternatively, livestream server 210 may select all segments determined to have an appearance of a board or sign.

In some embodiments, livestream server 210 may apply a predetermined score weight to each segment selected for each factor of the plurality of factors. For example, each factor may have an associated predetermined score weight related to an importance of the factor. For example, the number of times a product keyword is mentioned in a segment may have the greatest associated score weight out of all of the factors because a keyword being frequently mentioned may indicate a more product relevant segment amongst the plurality of segments. Thus, livestream server 210 may apply the score weight associated with product keyword to the segments selected for having the highest frequency of product keywords. Additionally or alternatively, detection of a price board may cause livestream server 210 to apply a price board score weight to increase the score of a segment because detection of a price board may indicate a more product relevant segment amongst the plurality of segments. On the other hand, a number of likes (live) and a number of chats (live) may each have a relatively low score weight out of all of the factors because the number of likes and chats monitored as a livestream is being broadcast in real-time may be less product relevant in comparison to the other factors, and thus may not be critical factors in determining product relevant segments, but may still have more weight than segments without any of the above factors. Exemplary score weights are discussed below with respect to FIG. 5.

Additionally or alternatively, livestream server 210 may be configured to calculate a difference score for each segment of the plurality of segments. For example, livestream server 210 may perform color histogram and motion vector analysis to, for each pair of adjacent video frames in a segment, compare the adjacent video frames by calculating an absolute difference of each pixel value (i.e., value describing brightness and color of a pixel) of the two adjacent video frames (e.g., compare (x,y) of frame 1 to (x,y) of frame 2). Once the absolute difference of each pixel value is determined, the values are summed, resulting in a sum of absolute differences (SAD) for the adjacent video frames. If the resulting frame SAD value is greater than 0, livestream server 210 may aggregate the value to an existing total SAD value for the segment. Once a frame SAD is determined for each pair of adjacent video frames in a segment and the total segment SAD is updated, livestream server 210 may compare the total segment SAD to a maximum segment SAD. For example, the maximum segment SAD may initially be set to a value of 0. When livestream server 210 calculates a first total segment SAD to be greater than 0, the first total segment SAD may be set as the maximum segment SAD. Additionally, when livestream server 210 calculates a second total segment SAD to be greater than the first total segment SAD, the maximum segment SAD may be updated to be the second total segment SAD value. Ultimately, the highest total segment SAD value for a segment may be set as the maximum segment SAD.

Once a total segment SAD is determined for each segment of the plurality of segments, livestream server 210 may calculate a difference score for each segment by determining a ratio of each total segment SAD to the maximum segment SAD. For example, livestream server 210 may determine that a total segment SAD value of a third segment (e.g., 100) has the greatest value, and may set it as the maximum segment SAD value. In this case, assuming that a total segment SAD value of a first segment has a value of 10, the segment highlight score for the first segment would be 10/100 (i.e., 0.1). Additionally, the segment highlight score for the third segment would be 100/100 (i.e., 1). Once a difference score is determined for each segment, livestream server 210 may apply a predetermined difference score weight (similar to the predetermined score weights discussed above) to each difference score, and add the weighted difference score to an existing segment highlight score for each segment of the plurality of segments.

In step 414, the at least one processor may be configured to select a number of segments from the plurality of segments based on the calculated segment highlight score of each segment. In some embodiments, livestream server 210 may be configured to rank each of the plurality of segments based on the calculated segment highlight scores. For example, livestream server 210 may assign a segment with the highest highlight score a rank of 1 and may assign a segment with the lowest highlight score a rank equivalent to the number of segments. In some embodiments, livestream server 210 may be configured to select a number of segments with the highest scores (i.e., highest ranks). For example, livestream server 210 may be configured to select a predetermined number of segments (e.g., 4, 5, 10, etc.) with the highest scores. In some embodiments, livestream server 210 may be configured to select a number of segments such that the total duration of all of the segments is within a predetermined range of time. For example, livestream server 210 may be configured to select a number of segments such that the total duration of all of the segments is between 4-5 minutes. In this case, if each segment is around 1 minute, livestream server 210 may be configured to select 4-5 segments.

In step 416, the at least one processor may be configured to generate a new video based on the selected segments. In some embodiments, livestream server 210 may be configured to merge the selected segments to generate a new video. In some embodiments, livestream server 210 may be configured to insert a transition between one or more pairs of segments. For example, livestream server 210 may insert a 3 second transition between each segment. In some embodiments, the transition may be a frame with information. For example, the transition may include a frame with information about the next segment determined by audio and/or video processing previously performed by livestream server 210. In some embodiments, the transition may include product information retrieved from a database, such as database 212. Additionally or alternatively, livestream server 210 may be configured to merge the selected segments in the order that they appeared in the source video. In some embodiments, livestream server 210 may be configured to merge the selected segments in rank order determined based on calculated segment highlight scores.

In step 418, the at least one processor may be configured to store the new video. In some embodiments, the new video may be stored in the same database that stores the plurality of source livestream videos. In other embodiments, the new video may be stored in a separate database from the database that stores the plurality of source livestream videos. Additionally or alternatively, storing the new video in a database, such as database 212, may make the new video available for view by users on a VOD platform associated with livestream server 210. In some embodiments, livestream server 210 may transmit a notification to user device(s) 220 indicating that a new highlight video is available for viewing on the VOD platform.

FIG. 5 shows an exemplary table 500 of factors and exemplary associated score weights. As described above, factors such as product keywords (ASR), price board, seek (VOD), play (VOD), add cart (VOD), add cart (live), price keywords (ASR), like (live), chat (live) and scene changes can be taken into consideration in determining a score for each segment to determine which segments are the most product relevant. "Product Keywords (ASR)" may be a number of product keywords (e.g., product name) detected in a segment using automatic speech recognition (ASR). "Price Board" may be a determination (e.g., yes or no) of whether a price board (e.g., sign, board with text) is detected in a segment using video processing, such as edge detection and/or text detection. "Seek (VOD)" and "Play (VOD)" may be factors associated with the most frequently re-watched segments in a livestream VOD video. For example, "Seek (VOD)" may be a number of times a certain segment of a livestream VOD video was sought out by one or more users, which may be determined by monitoring and tracking user interactions in user play logs for storage in a database, such as database 212. Similarly, "Play (VOD)" may be a number of times a certain segment of a livestream VOD video was played by one or more users, which may be determined by monitoring and tracking user interactions in user play logs for storage in a database, such as database 212. "Add Cart (VOD)" may be a number of times that livestream server 210 detects that a product was added to a user cart during a certain segment of a livestream VOD video. "Add Cart (Live)" may be a number of times that livestream server 210 detects that a product was added to a user cart during a certain segment of a livestream being broadcast in real-time. "Price Keywords (ASR)" may be a number of price keywords (e.g., product price) detected in a segment using ASR. "Like (Live)" and "Chat (Live)" may be a number of likes and a number of chats, respectively, detected during a certain segment of a livestream being broadcast in real-time. "Scene Changes" may be a factor related to detecting differences between frames (e.g., significant movement of the streamer, a change in the closeness of the streamer to the camera, detection of signs, etc.) based on analyzing color histograms and motion vectors, and calculating sum of absolute differences (SAD) and/or sum of squared differences (SSD).

Figure 6:
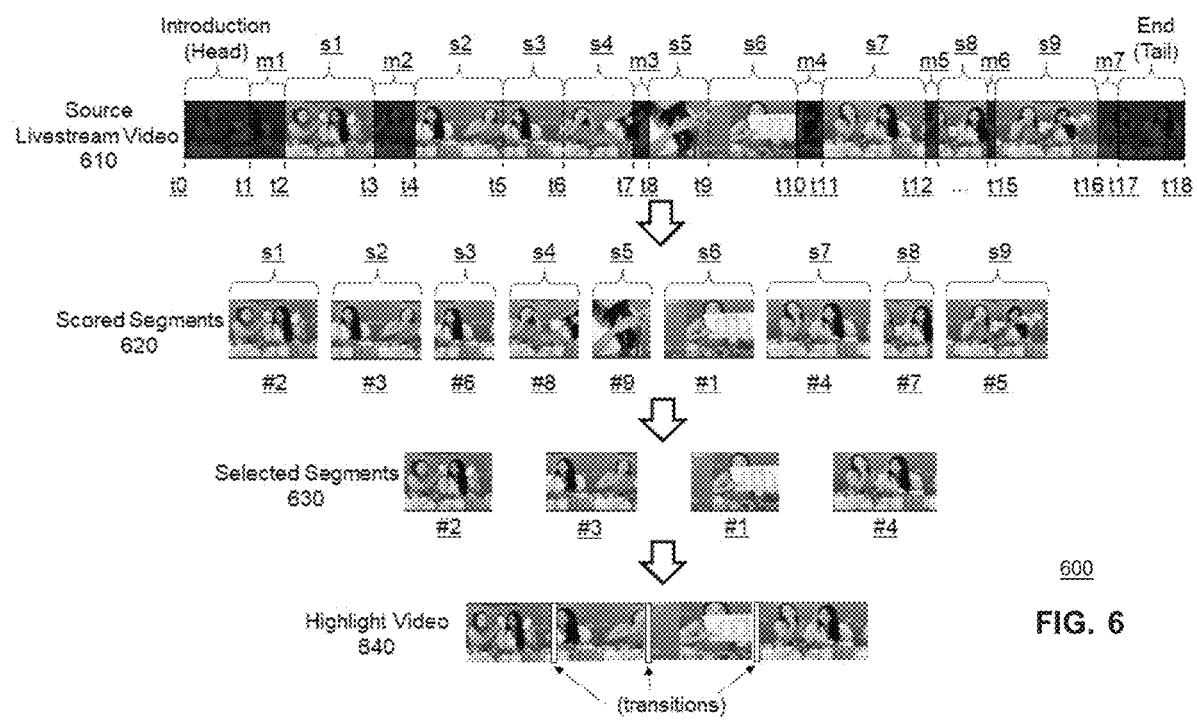
FIG. 6 shows a diagram illustrating an exemplary flow of automatically generating highlight videos, consistent with the disclosed embodiments.

FIG. 6 shows a diagram 600 illustrating an exemplary flow of the steps described in method 400 above. Diagram 600 begins with source livestream video 610, which includes an introduction (head), end (tail), mutes m1, m2, ... m7, segments s1, s2, ... s9, and timestamps t0, t1, ... t18. These may be identified with any of the audio and video processing techniques described above. Timestamps t1, t2, ... and t17 may indicate sentence breaks. Livestream server 210 may proceed to clip the source livestream video 610 at timestamps t1, t2, ... t17 and may remove the introduction (head), end (tail), and mutes m1, m2, ... m7, resulting in just segments s1, s2, ... s9, wherein each segment is around 1 minute long. Each of the segments may be scored according to the scoring techniques described above, resulting in scored segments 620. Of the scored segments, only the top 4 segments may be selected, resulting in selected segments 630. Each of the selected segments 630 may be merged with transitions between each segment and in the same order that they appear in source livestream video 610, resulting in highlight video 640.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for automatic generation of highlight videos, the system comprising:
one or more memory devices storing instructions; and
one or more processors configured to execute the instructions to perform operations comprising:
retrieving user action data for a plurality of source videos from a predetermined time period;
selecting, based on the retrieved user action data, a set of source videos of the plurality of source videos;
retrieving the selected set of source videos;
for each of the selected set of source videos:
analyzing the source video to identify clip points;
splitting the analyzed source video into a plurality of segments;
for each segment of the plurality of segments:
determining segment data based on the retrieved user action data;
calculating a segment highlight score based on the determined segment data;
comparing, for each pair of adjacent video frames in the segment, adjacent video frames;
determining a total sum of absolute difference for the segment based on the comparison;
calculating a difference score based on the determined total sum of absolute difference by comparing the total sum of absolute difference to a maximum total sum of absolute difference; and
determining a segment score by adding the difference score to the segment highlight score;
selecting a number of segments from the plurality of segments based on the calculated segment score of each segment;
generating a new video based on the selected segments; and
storing the new video.

2. The computer-implemented system of claim 1, the one or more processors configured to execute the instructions to perform operations further comprising:
monitoring a plurality of real time user actions during a livestream video;
compiling the plurality of real time user actions in one or more user action logs; and
storing the one or more user action logs in a database,
wherein the plurality of source videos are a plurality of finished livestream videos.

3. The computer-implemented system of claim 2, wherein the user interactions include at least one of seek actions and play actions associated with each source video by the one or more users.

4. The computer-implemented system of claim 1, wherein a duration of each segment of the plurality of segments is within a predetermined range of time.

5. The computer-implemented system of claim 1, wherein determining segment data includes determining a value for each factor of a plurality of factors.

6. The computer-implemented system of claim 5, wherein the plurality of factors includes at least a frequency of product keywords spoken, a frequency of plays, a frequency of seeks, a frequency of likes, a frequency of chats, and a number of times that a product was added to a viewer's cart.

7. The computer-implemented system of claim 6, wherein calculating a segment highlight score based on the determined segment data includes calculating a factor score for each factor of the plurality of factors.

8. The computer-implemented system of claim 7, wherein each factor of the plurality of factors has an associated predetermined weight and calculating the segment highlight score is based at least partially on the predetermined weight and the calculated factor score for each factor of the plurality of factors.

9. The computer-implemented system of claim 1, wherein selecting a number of segments from the plurality of segments based on the calculated segment highlight score of each segment includes selecting a predetermined number of segments with the highest segment highlight scores of the calculated segment highlight scores.

10. A computer-implemented method for automatic generation of highlight videos, the method comprising:
retrieving user action data for a plurality of source videos from a predetermined time period;
selecting, based on the retrieved user action data, a set of source videos of the plurality of source videos;
retrieving the selected set of source videos from a database;
for each of the selected set of source videos:
analyzing the source video to identify clip points;
splitting the analyzed source video into a plurality of segments;
for each segment of the plurality of segments:
determining segment data based on the retrieved user action data;
calculating a segment highlight score based on the determined segment data;
comparing, for each pair of adjacent video frames in the segment, adjacent video frames;
determining a total sum of absolute difference for the segment based on the comparison;
calculating a difference score based on the determined total sum of absolute difference by comparing the total sum of absolute difference to a maximum total sum of absolute difference; and
determining a segment score by adding the difference score to the segment highlight score;
selecting a number of segments from the plurality of segments based on the calculated segment highlight score of each segment;
generating a new video based on the selected segments; and
storing the new video in the database.

11. The computer-implemented method of claim 10, the method further comprising:
monitoring a plurality of real time user actions during a livestream video;
compiling the plurality of real time user actions in one or more user action logs; and
storing the one or more user action logs in a database,
wherein the plurality of source videos are a plurality of finished livestream videos.

12. The computer-implemented method of claim 11, wherein the user interactions include at least one of seek actions and play actions associated with each source video by the one or more users.

13. The computer-implemented method of claim 10, wherein a duration of each segment of the plurality of segments is within a predetermined range of time.

14. The computer-implemented method of claim 10, wherein determining segment data includes determining a value for each factor of a plurality of factors.

15. The computer-implemented method of claim 14, wherein the plurality of factors includes at least a frequency of product keywords spoken, a frequency of plays, a frequency of seeks, a frequency of likes, a frequency of chats, and a number of times that a product was added to a viewer's cart.

16. The computer-implemented method of claim 15, wherein calculating a segment highlight score includes calculating a factor score for each factor of the plurality of factors and is at least partially based on a predetermined weight associated with each factor of the plurality of factors.

17. The computer-implemented method of claim 10, wherein selecting a number of segments from the plurality of segments based on the calculated segment highlight score of each segment includes selecting a predetermined number of segments with the highest segment highlight scores of the calculated segment highlight scores.

18. A computer-implemented system for automatic generation of highlight videos, the system comprising:
   at least one processor; and
   at least one non transitory storage medium comprising instructions that, when executed by the at least one processor, cause the at least one processor to perform steps comprising:
      retrieving user action data for a plurality of source videos from a predetermined time period, wherein the user action data includes at least a plurality of monitored user interactions associated with each source video of the plurality source videos;
      selecting, based on the retrieved user action data, a predetermined number of source videos of the plurality of source videos;
      retrieving the selected source videos;
      for each of the selected source videos:
         analyzing the source video with audio processing to identify clip points;
         splitting the analyzed source video into a plurality of segments;
         for each segment of the plurality of segments:
            determining segment data based at least partially on the audio processing based on the retrieved user action data; and
            calculating a segment highlight score based on the determined segment data;
            comparing, for each pair of adjacent video frames in the segment, adjacent video frames;
            determining a total sum of absolute difference for the segment based on the comparison;
            calculating a difference score based on the determined total sum of absolute difference by comparing the total sum of absolute difference to a maximum total sum of absolute difference; and
            determining a segment score by adding the difference score to the segment highlight score;
      selecting a number of segments from the plurality of segments based on the calculated segment highlight score of each segment;
      generating a new video based on the selected segments; and
      storing the new video.

* * * * *